UNITED STATES PATENT OFFICE.

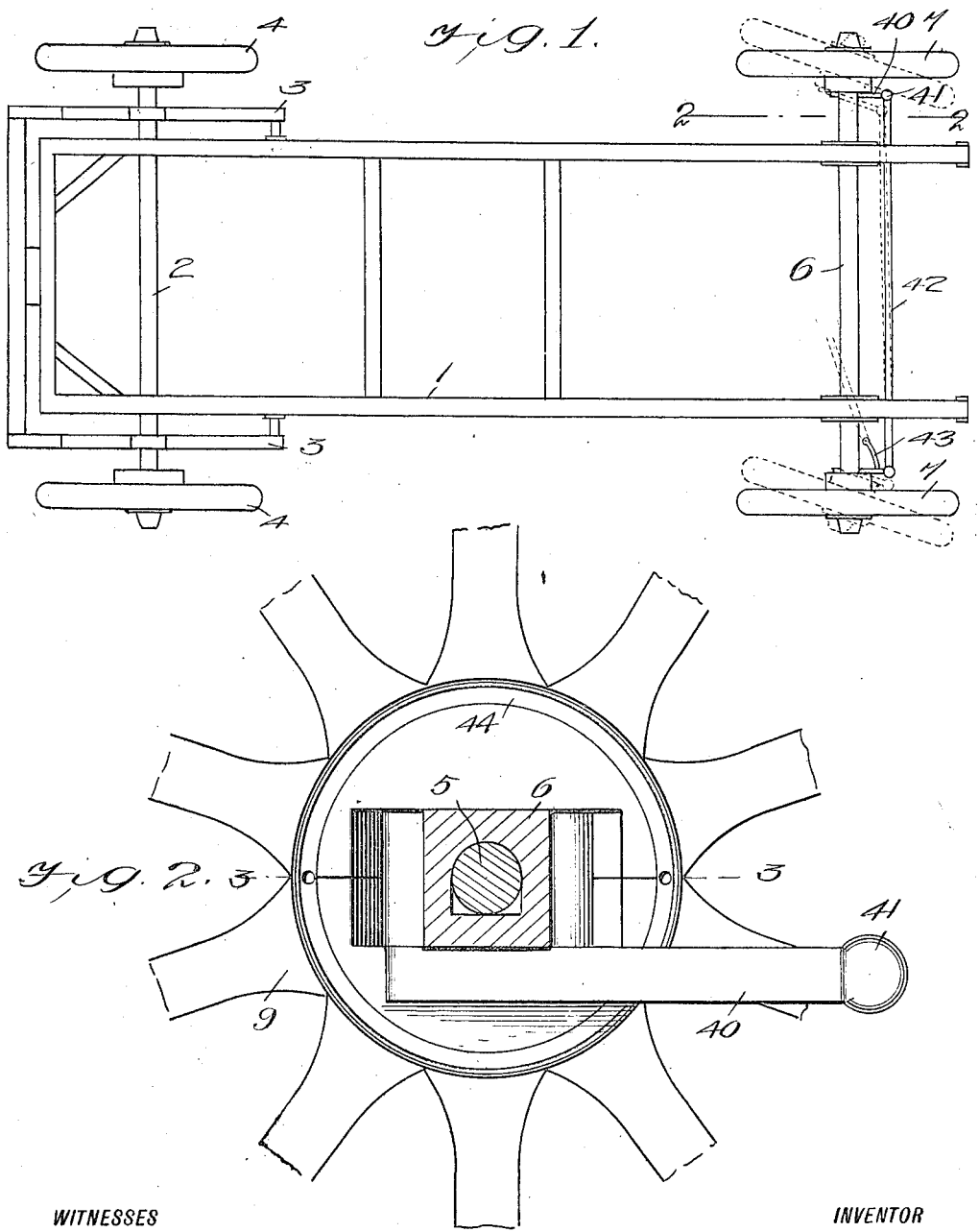

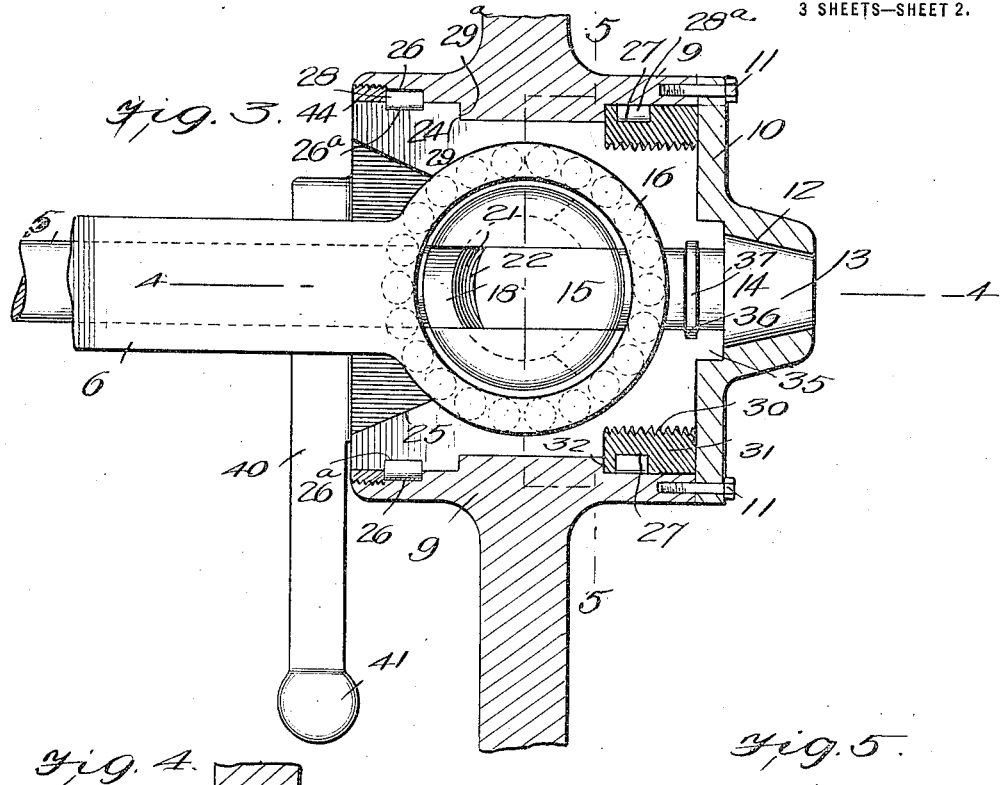

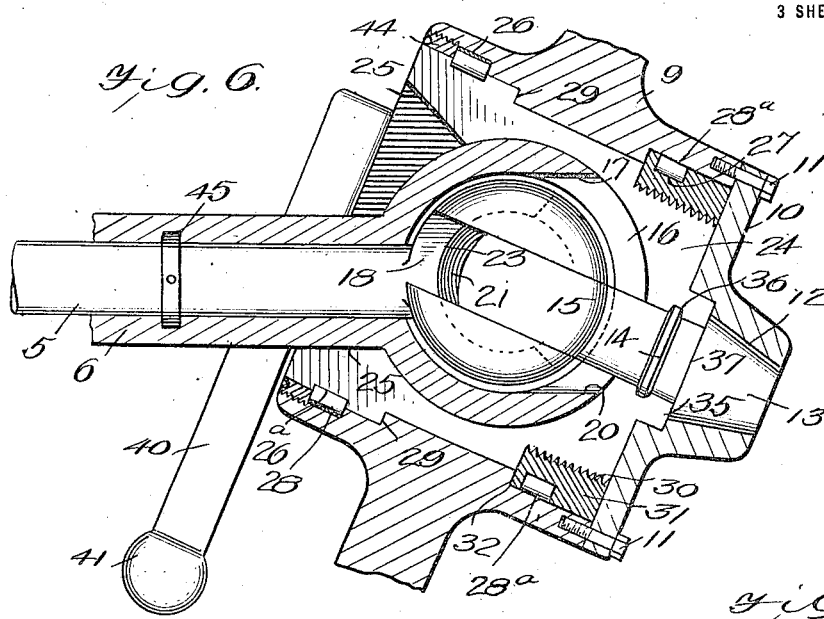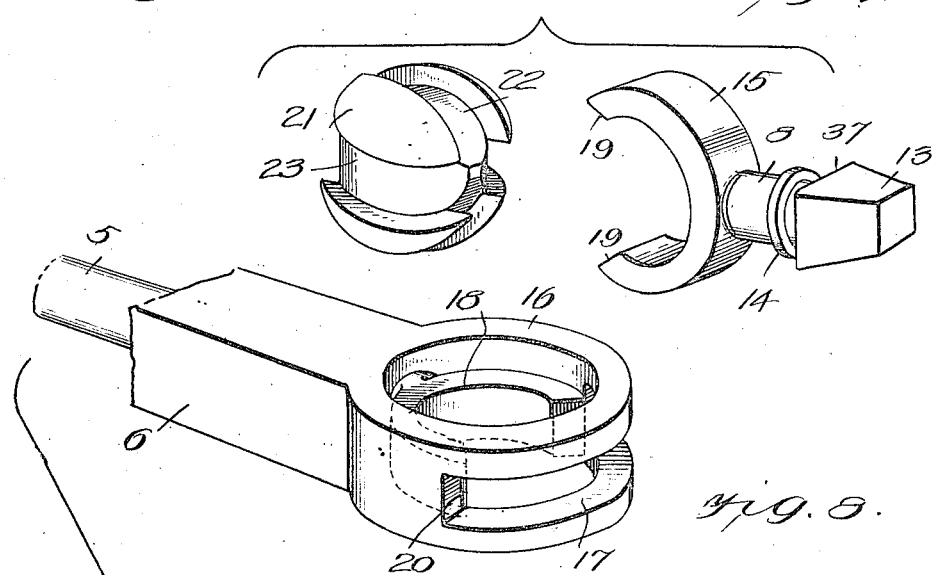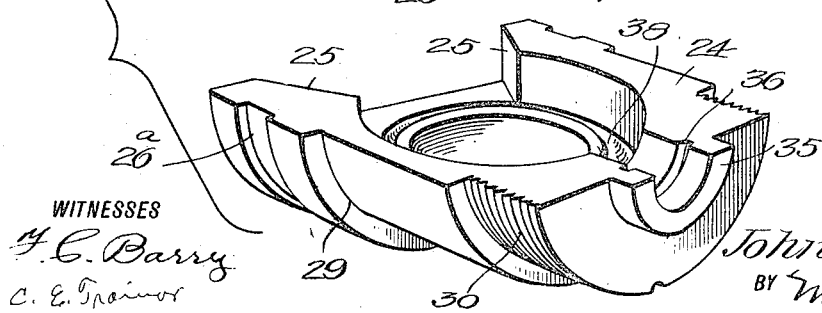

JOHN MARTIN LULL, OF WAUSAU, WISCONSIN.

DRIVING MECHANISM FOR AUTOMOBILES AND LIKE VEHICLES.

1,146,632.

Specification of Letters Patent.

Patented July 13, 1915.

Application filed March 12, 1914. Serial No. 824,285.

*To all whom it may concern:*

Be it known that I, JOHN M. LULL, a citizen of the United States, and a resident of Wausau, in the county of Marathon and State of Wisconsin, have invented a new and useful Improvement in Driving Mechanism for Automobiles and like Vehicles, of which the following is a specification.

My invention is an improvement in driving mechanism for automobiles and like vehicles, and has for its object to provide a mechanism of the character specified for connecting the front wheels of the vehicle to the axle in such manner that while the wheels may move with respect to the axle to guide the vehicle, they will yet be constrained to rotate with the axle to permit the four wheels of the vehicle to be driven from the motor.

In the drawings:—Figure 1 is a top plan view of the frame of an automobile provided with the improved drive, Fig. 2 is a section on the line 2—2 of Fig. 1, Fig. 3 is a section on the line 3—3 of Fig. 2, Figs. 4 and 5 are sections on the lines 4—4 and 5—5, respectively, of Fig. 3, Fig. 6 is a view similar to Fig. 3, showing the parts in another position. Fig. 7 is a perspective view of the connection between the spindle and one of the elements of the universal joint, with the parts detached, and Fig. 8 is a similar view of the end of the axle and a section of the bearing with the parts detached.

The present embodiment of the invention is shown in connection with the frame 1 of an automobile, the said frame being supported by a rear axle 2, which is connected to the frame by means of springs 3, and wheels 4 are secured to the ends of the axle.

The front axle 5 is arranged within a housing 6, and the wheels 7 are secured to spindles 8, each wheel having a hub 9, journaled on the spindles. The outer end of the hub of each front wheel is normally closed by a cover plate 10, which is secured to the hub by means of screw bolts 11, and the cover plate is provided at its center with a frusto-pyramidical bearing 12, integral with the cover plate, the bearing having its large end inward.

Each of the spindles 8 for the front wheels is provided with a frusto-pyramidical head 13 at its outer end, and the said head fits the bearing 12 of the adjacent wheel hub. The head 13 by its engagement with the bearing 12 constrains the hub and the wheel to rotate with the spindle, and the spindle is connected to the axle in a manner to be presently described. Each of the spindles is provided intermediate its ends with an annular rib 14, and the inner end of each spindle is integral with an arc-shaped cross head 15.

Each end of the axle housing 6 is provided with an annular or ring-shaped casing 16, and the said casing is provided with a circumferential slot 17. The axle is provided at each end with an arc-shaped cross head 18, resembling closely the cross head 15 of the spindle, and it will be noted that the ends of the cross head 15 as well as the ends of the cross head 18 are beveled, as indicated at 19 and 20, respectively.

A ball 21 is provided for connecting the cross heads 15 and 18, and the said ball is provided with annular grooves 22 and 23, respectively, for engagement by the cross head 15 of the spindle and the cross head 18 of the axle. The ball 21 is held within the casing 16 of the axle housing with the cross head 18 of the axle engaging the groove 23 and with the cross head 15 of the spindle engaging the groove 22.

The casing 16 of the housing 6 is arranged within a sectional bearing held within the hub. The bearing is composed of similar sections 24, which are internally shaped to receive the casing 16, the said casing being held half in one section and half in the other, and the adjacent faces of the sections are superposed in contact. The bearing is fixed with respect to the hub, but is movable with respect to the housing 6, and the casing 16, and the inner end of the bore or interior of the bearing is tapering, as indicated at 25 in Figs. 3, 6 and 8.

The hub proper 9 is provided with an internal annular groove 26 near the inner end thereof, and each of the bearing sections 24 is provided with a peripheral groove 26ª, for coöperating with the groove 26 to form a bearing race, for receiving a roller bearing 28. The bearing sections 24 are annularly reduced just outside of the groove 26ª to form an annular shoulder 29, and the said shoulder bears against a similar shoulder 29ª in the interior of the hub, the shoulder 29ª being formed by enlarging the inner end of the bore of the hub. Near their outer ends the bearing sections 24 are again reduced, and externally threaded as shown at 30, and a ring 31 is threaded on to the sections at the reduced portion. The ring has an external annular groove 27, forming a bearing race for receiving a roller bearing 28ª, the peripheries of the rollers being adapted to engage the interior of the hub. The hub is enlarged internally at its outer end to receive the ring 31, the ring being of greater thickness than the depth of the reduced portions of the bearing sections 24, so that when the ring is in place, it will extend beyond the outer surface of the bearing section. The enlargement for the ring provides an annular shoulder 32 within the hub, and facing in the opposite direction to the shoulder 29ª, and the inner edge of that portion of the ring which extends beyond the bearing section engages this shoulder. The ring is locked from rotation by means of set screws 34, the set screws engaging coöperating grooves in the interior of the ring and at the exterior of the threaded portion of the bearing section.

The cover plate 10 of the hub is provided with an annular recess 35ª at the bearing 12, and each of the bearing sections 24 has an arc-shaped rib 35 at its outer end, the ribs engaging the recess, and each bearing section is provided with a groove 36 for receiving the rib 14 of the spindle. The shoulder 37 formed between the inner end of the head 13 of the spindle and the body thereof engages the ends of the ribs 35.

The bearing sections 24 before mentioned, are internally grooved in annular form as shown at 38 at the ends of the casing 16, and ball bearings 39 are arranged in the grooves, the said balls bearing against the ends of the casing 16 and the bottoms of the grooves 38.

An arm 40 is rigidly connected with the lower bearing section 24 at the inner end thereof, and the free end of the arm is provided with a ball 41, for universal joint connection with a steering link 42 arranged parallel with the front axle, and steering mechanism 43 is connected with one of the arms. The link 42 constrains the arms and the front wheels to swing together, as indicated in dotted lines in Fig. 1 to guide the vehicle.

The ball 21 can move angularly freely in a horizontal plane with respect to the axle, but cannot move angularly in a vertical plane, because of the engagement of the cross head 18 with the groove 23. The ball 21 can move freely angularly in a vertical plane with respect to the spindle, but the said ball cannot move angularly in a horizontal plane with respect to the spindle.

The spindle passes through the slot 17 of the ring or casing 6, and the walls of the slot prevent vertical movement of the spindle, and guide the spindle in its lateral movement with respect to the axle.

The improved connection is assembled as follows:—The ball 21 and the cross head 18 of the axle are first assembled within the casing 16. The cross head 15 is then engaged with the groove 23 of the ball by turning the said head into register with the slot 17 and then inserting the cross head through the slot into engagement with the groove. The ring 31 is arranged within the hub with the ball bearing 28ª in place. The bearing sections 24 are then placed with their adjacent faces in contact, inclosing the casing 16, after which the said bearing sections 24 are threaded into engagement with the ring 31. The wheel may be turned to cause the threaded portion of the bearing sections 24 to enter the ring. The roller bearing 28 is then inserted from the inner side of the wheel, and the said bearing is held in place by a retaining ring 44, the said ring being threaded into the inner end of the hub. The cover plate 10 may now be placed after the locking screws 34 have been inserted. The sectional bearing 24 is held in the hub by the roller bearings 28 and 28ª, and by the locking ring 31.

The spindle is held from longitudinal movement with respect to the sectional bearing by the rib 14, and the hub is constrained to turn with the spindle through the engagement of the head 13 with the bearing 12 of the cover plate. The axle 5 is provided with an annular rib 45, which engages with an annular groove 46 in the housing 6 of the axle to prevent relative longitudinal movement of the housing and the axle.

In operation, when the link 42 is moved longitudinally by the steering mechanism (not shown), the arms 40 will be swung in the same direction and will swing the wheels on a vertical axis as indicated in dotted lines in Fig. 1. The spindle is constrained to rotate with the axle by the universal joint connection, and the spindle may swing laterally with respect to the axle in a horizontal plane, the spindle moving in the slot 17 of the ring or casing 16.

With the improved construction the motor may be connected to the four wheels to drive the front wheels as well as the rear wheels and without interfering in any manner with the guiding of the vehicle. It will be noticed that the roller bearings 28 and 28ª are both held in cages 47 and 47ª, respectively.

I claim:—

The combination with the driving and the driven members, and the universal joint connecting the said members, of a ring-shaped casing encircling the joint and having a bearing through which one member extends and having a circumferential slot through which the other member extends, a sectional bearing inclosing the joint and the casing, said bearing consisting of similar sections, the sections being recessed on their adjacent faces to receive the joint and the casing, a sleeve inclosing the bearing sections to hold them together, and means for holding the sleeve in place on the bearing section.

JOHN MARTIN LULL.

Witnesses:
   EDW. G. HUNGER,
   JOHN PRAHL.